(12) United States Patent
Korrapati et al.

(10) Patent No.: US 11,706,717 B2
(45) Date of Patent: Jul. 18, 2023

(54) SYSTEMS AND METHODS FOR PROVIDING AUTOMATIC ENABLING AND DISABLING OF WIRELESS COMMUNICATIONS FOR USER EQUIPMENT

(71) Applicant: Verizon Patent and Licensing Inc., Basking Ridge, NJ (US)

(72) Inventors: Sudhir Korrapati, Acton, MA (US); Carl Wang, Syosset, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 32 days.

(21) Appl. No.: 17/480,267

(22) Filed: Sep. 21, 2021

(65) Prior Publication Data

US 2022/0007294 A1 Jan. 6, 2022

Related U.S. Application Data

(63) Continuation of application No. 16/780,097, filed on Feb. 3, 2020, now Pat. No. 11,197,244.

(51) Int. Cl.
*H04W 4/50* (2018.01)
*H04W 52/02* (2009.01)
*G06N 20/00* (2019.01)
*H04W 64/00* (2009.01)

(52) U.S. Cl.
CPC ........ *H04W 52/0251* (2013.01); *G06N 20/00* (2019.01); *H04W 52/0274* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2010/0250025 A1 | 9/2010 | Vasek et al. | |
| 2015/0134451 A1 | 5/2015 | Farrar et al. | |
| 2019/0158654 A1* | 5/2019 | Way | H04W 60/04 |
| 2019/0220697 A1* | 7/2019 | Kiemele | G06V 20/52 |

* cited by examiner

*Primary Examiner* — Gary Lafontant

(57) ABSTRACT

A user equipment ("UE") described herein may use automated techniques to receive one or more mode triggers, each including one or more sensor profiles. The UE may monitor data from one or more sensors associated with the UE and may compare the data to the profiles. The UE may determine that the sensor data matches a profile; and may disable one or more wireless features. The UE may continue to monitor sensor data and may determine that an exit trigger condition has been satisfied based on the received data. The exit trigger condition may specify a particular mode trigger; and a set of exit sensor profiles that corresponds to an exit of the particular mode trigger. The UE may, based on determining that the exit trigger condition has been satisfied, activate one or more wireless features. The sensor profiles and/or exit trigger conditions may be received from a cloud-based entity.

20 Claims, 7 Drawing Sheets

SYSTEMS AND METHODS FOR PROVIDING AUTOMATIC ENABLING AND DISABLING OF WIRELESS COMMUNICATIONS FOR USER EQUIPMENT

CROSS-REFERENCE TO RELATED APPLICATION

This Application is a Continuation of U.S. patent application Ser. No. 16/780,097, flied on Feb. 3, 2020, titled "SYSTEMS AND METHODS FOR PROVIDING AUTOMATIC ENABLING AND DISABLING OF WIRELESS COMMUNICATIONS FOR USER EQUIPMENT," the contents of which are herein incorporated by reference in their entirety.

BACKGROUND

Use of various electronic device features, such as radio communication elements of User Equipment ("UE") such as mobile telephones, tablet devices, laptops, or the like, may be prohibited during airplane travel or transport, or portions thereof (e.g., takeoff and/or landing).

DETAILED DESCRIPTION OF THE PREFERRED EMBODIMENTS

The following detailed description refers to the accompanying drawings. The same reference numbers in different drawings may identify the same or similar elements.

Embodiments described herein provide techniques for selectively enabling or disabling wireless communications of a User Equipment ("UE") based on trigger events using location and/or other sensing capabilities of the UE. Some embodiments may use machine learning and/or other techniques to determine or refine the determination of when such events occur, thus enhancing the reliability of the determination of when UEs should enable or disable wireless communication features.

One such example of enabling or disabling wireless communication features is an "airplane mode" feature. In accordance with some embodiments, the airplane mode feature may be activated or deactivated during takeoff and/or landing of an aircraft, and/or at some other suitable time. Enabling and/or disabling wireless communication features (e.g., enabling and/or disabling airplane mode) may include, for instance, enabling and/or disabling global positioning system ("GPS") position sensors, cellular transmitters and/or receivers, and/or other wireless communication circuitry and/or logic (e.g., Bluetooth, Wi-Fi, etc.).

Figure 1:
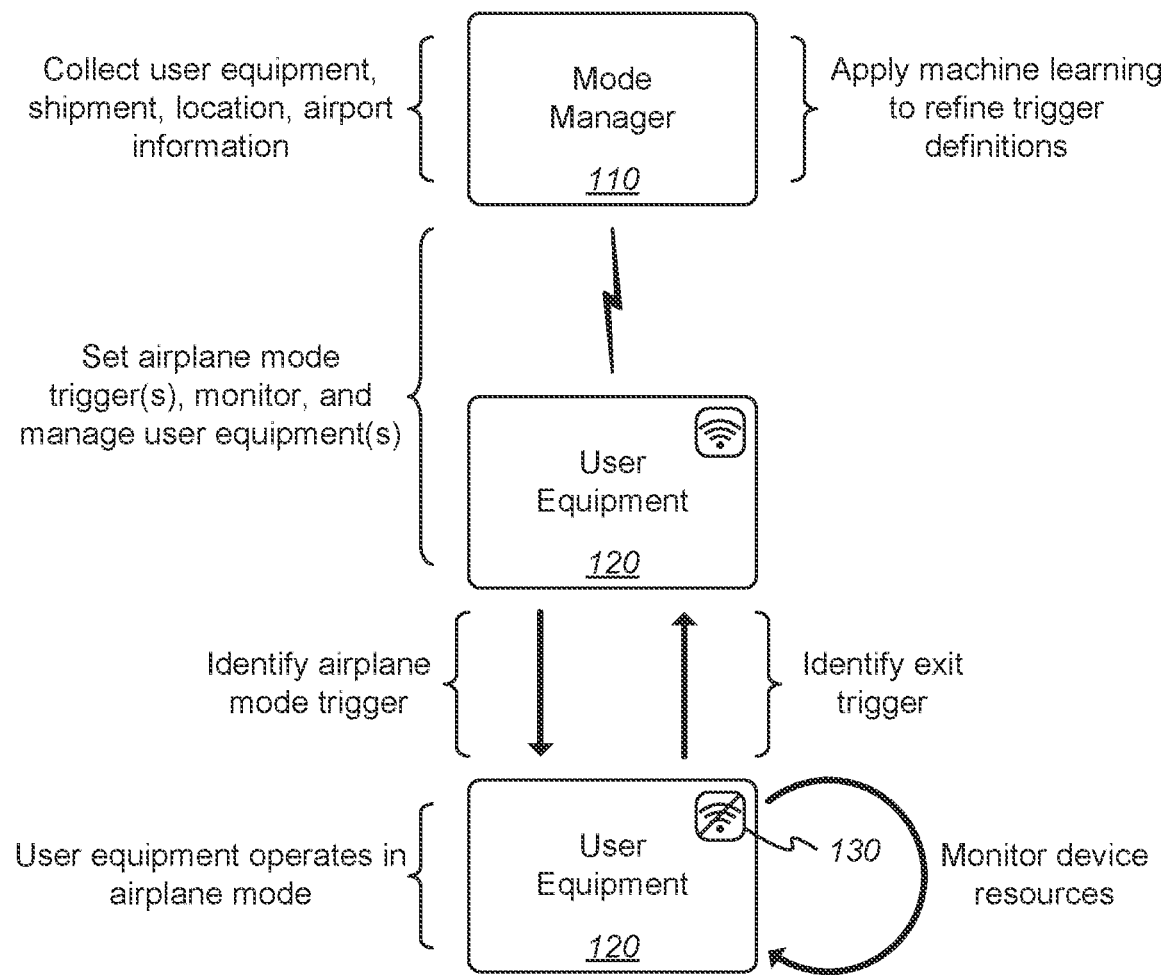
FIG. 1 illustrates the utilization of machine learning techniques to generate and use triggers to provide automatic activation and/or deactivation of wireless communications associated with a UE, in accordance with embodiments described herein.

FIG. 1 illustrates the utilization of machine learning to generate and use triggers to provide automatic activation and/or deactivation of wireless communications associated with a UE, in accordance with embodiments described herein. As shown, a mode manager 110 (e.g., one or more devices) may collect UE information, itinerary or shipment information, location or geographic information, airport information, and/or other information relevant to the determination of whether a given UE should enable or disable its wireless communications.

The UE information may include identifying information related to UE 120 (e.g., an identifier of UE 120, such as an International Mobile Subscriber Identity ("IMSI"), an International Mobile Station Equipment Identity ("IMEI"), an Mobile Directory Number ("MDN"), and/or some other identifier), UE location information (e.g., location information determined by UE 120, such as using a GPS technique, and/or location information determined by a wireless network, such as using a triangulation technique), and/or other relevant information related to UE 120. The UE information may be received from UE 120, a storage associated with mode manager 110, and/or various network-accessible resources (e.g., an Home Subscriber Server ("HSS"), a Unified Data Management function ("UDM"), and/or other devices or systems associated with a wireless network with which UE 120 is associated).

The itinerary information may include information regarding a scheduled travel route associated with UE 120, such as origin, destination, intermediate stops, departure time(s), arrival time(s), expected transit time(s), etc. Location information may be provided at various levels of granularity. For instance, an origin or destination may include a region or city, airport, terminal, specific plane, latitude and longitude coordinates, or some other representation of location.

Itinerary information may be received from various appropriate resources. For instance, in some embodiments, itinerary information for a particular UE 120 may be provided by UE 120. As another example, a carrier server or other such resource may provide itinerary information via an application programming interface ("API"), web-based resource, and/or other appropriate resources available to UE 120 (e.g., an update message service where mode manager 110 may distribute information updates to some or all UEs 120 by exchanging a set of update messages with UEs 120).

Itinerary information may be static or dynamic. For instance, in some embodiments only static information such as an origin, destination, expected departure time, and/or expected arrival time may be provided. As another example, a carrier may provide dynamic itinerary information via a live feed, where such a live feed may include information such as departure time, arrival time, shipment status, flight status, etc., where such information is updated at regular intervals, based on some update criteria (e.g., a status change from on-time to delayed, a change in expected departure time, etc.), and/or based on other relevant factors. As still another example, an itinerary may be predicted, estimated, or otherwise generated based on machine learning models and limited or no itinerary information available. For instance UEs 120 having a current location associated with a particular airport five minutes before noon on a Wednesday may be inferred to be departing on a scheduled flight that departs from that particular airport on Wednesdays at noon.

Location or geographic information may include information related to location of UE 120. Such location information may be provided at various levels of granularity, as appropriate for a particular application, status, location tracking resource, etc. For instance, a location may include specific longitudinal and latitudinal coordinates. As another example, a location may include an airport, terminal, or aircraft. In some embodiments, the location or geographic information may include geofence information (e.g., geofence definitions and/or events).

Location information may be received from various appropriate resources. For instance, location information may be received from UE 120 (e.g., as determined by UE 120, such as by using GPS or other suitable techniques performed by UE 120). As another example, location information may be received from a carrier database or other carrier resource (e.g., a device or system associated with a wireless network, which may determine the location of UE 120 by a Mobility and Management Entity ("MME"), Access and Mobility Management Function ("AMF"), or other suitable device or system). Additionally, or alternatively, some embodiments may include various beacons, sensors, readers, and/or other devices that are able to interact with UE 120. Such devices may include proximity sensors that are able to interact with UE 120 over a wireless channel and may provide an indication when UE 120 passes within a threshold proximity to the proximity sensors (sometimes referred to as "geofencing").

Airport information may include information related to various airports. Such airports may be associated with an origin, destination, intermediate stop, and/or region. Airport information may include an airport location, which may be specified as a set of longitudinal and latitudinal coordinates, as a geofence center point and radius, and/or other appropriate information. Airport information may further include information such as hours of operation, associated carriers or other transport resources, potential origins or destinations, etc.

As further shown in FIG. 1, mode manager 110 may analyze the collected information in order to generate one or more communication mode triggers to be applied to UE 120. Such communication mode triggers may include various parameters, depending on the available information. For instance, if only a departure city is specified, the communication mode triggers may specify a condition that the trigger is met when UE 120 is located within a threshold distance of an airport in the city. For example, the trigger may include geofence areas associated with each airport in the city.

As another example, if a live feed of itinerary information (e.g., which may indicate progress along a travel route) is available, mode manager 110 and/or UE 120 may update trigger definitions at regular intervals, based on some specified update criteria, and/or under other appropriate conditions. For instance, mode manager 110 and/or UE 120 may receive itinerary information from a carrier resource, such as a server, where the received itinerary information may include a specific terminal or aircraft location, expected arrival and/or departure times, expected transit time, etc. As one example, a trigger definition associated with a departure event may be updated such that an area or location associated with the trigger definition is narrowed to reflect the more specific information (e.g., the trigger definition may be associated with the plane or terminal location rather than a location of the airport). As another example, if the received itinerary information includes an updated departure time, the trigger may be updated to reflect the updated time. As still another example, mode manager 110 and/or UE 120 may receive weather information from an online resource and may update trigger definitions based on the received information (e.g., by increasing an expected time in transit and arrival time based on an increase in predicted headwind speed).

A trigger may include multiple conditions (e.g., an origin location and a departure time). Mode manager 110 may send a configuration message to UE 120 including the trigger information. The trigger definition may include various different elements associated with various different sensors and/or measurement capabilities of UE 120. For instance, the trigger definition may include UE sensor data associated with takeoff information such as data associated with an accelerometer, speedometer, barometer, altimeter, user interface ("UI") elements, and/or other suitable sensors (e.g., a microphone or camera). For instance, audio data collected via a microphone of UE 120 may be compared to a trigger including a sonic profile associated with engine noise, such that various operating conditions, events, and/or other information may be derived from the collected audio data (e.g., a sonic profile associated with taxiing, a sonic profile associated with a takeoff event, etc.). As another example, a trigger definition may include events based on inputs received via various UI elements. For instance, a user may use a graphical UI or keyboard to manually enable or disable the communication mode feature.

In some embodiments, the triggers may be monitored at mode manager 110 and/or UE 120. For example, mode manager 110 may provide (or may have provided) one or more triggers to UE 120. Based on these triggers, UE 120 may monitor its location, information from one or more sensors of UE 120, a received itinerary associated with UE 120, or other suitable information, to determine whether a given trigger is met. A given trigger may be "met" when sensor data, monitored or determined by UE 120, matches one or more sensor data profiles associated with the trigger. In some embodiments, the monitored sensor data may "match" a sensor data profile associated with the trigger when the monitored sensor data exactly matches the sensor data profile. In some embodiments, a suitable similarity or correlation analysis may be performed to determine whether a measure of similarity, between the monitored sensor data and the sensor data profile, exceeds a threshold measure of similarity.

In some embodiments, mode manager 110 and UE 120 may communicate across various networks (e.g., wireless, cellular, etc.) in order to identify trigger events associated with UE 120. For example, mode manager 110 may receive an itinerary associated with UE 120 from an external source (e.g., a source other than UE 120), indicating that UE 120 is scheduled to be located on an aircraft that is departing from a particular city at a particular time, and may receive location information from UE 120 at the particular time indicating that UE 120 is located at an airport in the particular city. In this instance, mode manager 110 may determine that this trigger is met, and that UE 120 should disable its wireless communication features. As described below, mode manager 110 may also indicate a duration for which UE 120 should disable its wireless communication features (e.g., a scheduled flight duration, as indicated by the itinerary), after which UE 120 may be configured to automatically enable its wireless communication features without further instruction.

If a communication mode trigger event is identified, UE 120 may disable its communications (e.g., operate in airplane mode, as indicated by icon 130). During airplane mode operation, modules, features, circuitry, etc. related to wireless communications to and/or from UE 120 may be disabled, powered down, deactivated, etc. Such modules, features, etc. may include location services. Thus, as briefly referred to above, UE 120 may monitor local device resources or other information in order to identify an airplane mode exit event.

After disabling communications, UE 120 may detect additional triggers, such as aircraft takeoff events, using various UE sensors. An aircraft takeoff event (or, simply, a "takeoff event") may refer to an instance of an aircraft taking off from or departing an airport, airfield, landing strip, etc. In some embodiments, if communications are disabled based on identification of a communication mode trigger event, an additional trigger may be specified time threshold (e.g., a location-based communication mode trigger may be followed by a takeoff event within a specified time). An exit event definition may include detection of an aircraft landing event. An aircraft landing event (or, simply, a "landing event") may refer to an instance of an aircraft landing at an airport, airfield, landing strip, etc., such as after completing a flight.

Accelerometer data available locally at UE 120 may be monitored to identify the takeoff event and the landing event, as the motion profiles associated with such events may be distinctive relative to other situations or conditions (e.g., transit via ship, truck, etc.). Takeoff and/or landing events may include, for instance, a minimum specified acceleration (or deceleration) threshold, minimum specified duration of acceleration exceeding the specified threshold, calculated initial or final speed based on measured acceleration data, etc.

As another example, if an expected transport time was received by UE 120 (e.g., as part of an itinerary, included in an update message from mode manager 110, etc.), an exit event definition may include a specified transit duration such that UE 120 may wait the specified transit duration (e.g., the expected transport time plus a buffer time) before exiting airplane mode 130. The buffer time may be based on various relevant factors. For instance, a percentage or fraction of the total expected transit time may be added to the buffer time to account for routine delays, changes in weather, etc. The buffer time may include elements associated with an origin and/or destination. For instance, machine learning analysis may generate airport-specific expected deviations based on previous flight data associated with the origin and/or destination airport, and such airport-specific deviations may be included in the buffer time. For example, if flights to a particular destination airport (e.g., during a particular time of day, day of week, season, etc.) typically experience delays (which may be due to, for example, recurring weather conditions such as fog or snow), the particular destination airport may be associated with a buffer time that is determined based on delays experienced by past flights (e.g., an average delay, median delay, etc.). The buffer time may include elements related to various other attributes or factors. Such attributes and/or factors may include, for instance, carrier performance history, aircraft type, expected departure time (e.g., increased delays may be associated with a particular time of day), expected arrival time, aircraft load relative to capacity, and/or weather conditions.

If an exit trigger is identified, UE 120 may exit airplane mode 130 and may activate wireless communication services such as location tracking and radio communication (e.g., voice and/or data services). Upon such reactivation, UE 120 may interact with mode manager 110 to provide updated location information and/or shipment status, receive updated or additional trigger definitions, etc.

Some embodiments may store information related to identified events and apply machine learning to refine trigger definition and event identification. For instance, if a wireless communication mode deactivation trigger event is identified based on location (e.g., GPS data indicating proximity to an airport), but a user manually overrides the trigger event (e.g., by re-enabling wireless communications), the machine learning model may be updated to reflect that wireless communications should not be deactivated under the specified circumstances (e.g., by updating the trigger definition to have a closer proximity to the trigger location).

As another example of feedback that may be utilized to refine the machine learning model, if UE 120 erroneously identifies an exit trigger event and enables wireless communication features based on the erroneous identification of the exit trigger event, and UE 120 determines, after activating such wireless communication features (e.g., GPS features), that the exit trigger was erroneous, UE 120 may re-enter airplane mode and send feedback associated with the erroneous identification when communication is enabled (e.g., upon detection of a subsequent exit event trigger). For instance, UE 120 may retrieve altimeter data to determine that a current elevation above sea level does not match the expected elevation at a destination airport (e.g., a measured elevation of 10,000 feet above sea level when a destination airport indicated in the itinerary has a specified elevation of 100 feet above sea level). As another example, accelerometer data may be compared to a vibration profile indicating air travel, where accelerometer data that matches (e.g., within a threshold similarity, using a suitable similarity analysis) a vibration profile indicating air travel may indicate that UE 120 has erroneously detected an exit event. As still another example, if UE 120 determines that wireless signals such as voice and/or data services are not available (e.g., a wireless network is not reachable) when airplane mode is disabled, an erroneous exit event may be identified.

As another example, UE 120 may identify a particular airplane mode trigger event (e.g., a landing event that is associated with a landing of an aircraft on which UE 120 is located) based on a particular motion "profile" or "signature" (referred to herein as an "motion profile") associated with sensor readings taken by one or more sensors of UE 120. The one or more sensor readings may be motion sensor readings taken by one or more motion sensors of UE 120. Such "motion sensors" may include various elements that are able to detect motion, location, and/or otherwise measure the environment of UE 120 to identify events such as takeoff and/or landing events. Such motion sensors may include, for instance, accelerometers, speedometers, gyroscopes, pressure sensors, GPS sensors, global navigation satellite system ("GNSS") sensors, altimeters, and/or other type of sensor that detects or measures motion. A motion profile may include an altitude profile that defines takeoff and/or landing events based on altitude information received from the local sensors of UE 120. A motion profile may include a set of motion sensor readings within a given duration of time.

For example, a particular motion profile may include one hundred sensor readings taken within one second by an accelerometer of UE 120. Such motion profiles may be associated with takeoff events, landing events, taxi events, cruising events, and/or other types of events or states associated with transport or travel. Mode manager 110 may apply machine learning to collected acceleration data (and/or other appropriate sensor data collected at UE 120) and data regarding takeoff, landing, and/or other such events in order to generate motion profiles. Such profiles may be associated with specific UEs 120, UE types, aircraft or aircraft type, airports (e.g., profiles may be associated with specific runways), weather conditions, time of day, flight path, and/or other appropriate resources or conditions.

UE 120 may activate wireless communications based on matching of current sensor data collected at UE 120 to a motion profile and thus identify a landing event. If, upon activation of wireless communication features, sensor data indicates UE 120 is still airborne (e.g., the exit event was detected erroneously), the machine learning model may be updated to reflect that wireless communications should not be activated based on such a motion profile (and wireless communications may be deactivated).

As still another example, UE 120 may identify a takeoff event based on acceleration data measured at local sensors of UE 120. UE 120 may provide, upon activation of wireless communication features, feedback to mode manager 110 indicating the measured data associated with the identified takeoff event (e.g., accelerometer data). In addition to such data received from UE 120, mode manager 110 may receive, for instance, data indicating aircraft location, where such data may be received from a resource such as a carrier server. Analysis of aircraft location may indicate that the identified takeoff event was erroneous (i.e., the aircraft was still grounded at the time of the erroneously identified event, and/or that the aircraft has not moved within a threshold period of time after the potential takeoff event was identified), the machine learning model may be updated such that a takeoff event is not identified based on the measured acceleration data, and/or information correlating the measured acceleration data to a takeoff event may be modified (e.g., weighted less heavily). A similar approach may be applied to landing events and activation of wireless communications.

As another example of machine learning, UE 120 may identify partial satisfaction of a trigger definition (e.g., a proximity threshold relative to an airport) and may further analyze UE 120 information such as location or accelerometer information. If analysis of UE 120 location or accelerometer data indicates that UE 120 is stationary (indicating, for instance, that UE 120 is in a cargo hold of an aircraft), the machine learning model may indicate that UE 120 is more likely to experience a takeoff event the longer UE 120 is stationary and may update a communication mode trigger definition such that wireless communication is more likely to be disabled the longer the aircraft is stationary. Thus, for instance, a trigger definition that includes a departure time may be updated to account for an earlier departure if UE 120 is stationary for longer than a threshold duration.

As another example, itinerary information may be estimated or predicted based on location information associated with UE 120. For instance, UE 120 may be determined to be at a location associated with a particular airport gate (e.g., within fifteen meters of the gate). Flight information may be retrieved based on information associated with a next scheduled departure from the particular gate and a communication mode trigger event may be identified if the scheduled departure is within a particular time threshold (e.g., thirty minutes). As another example, if UE 120 is determined to be located within a geofence associated with an airport, mode manager 110 may retrieve flight information for the next available flights from the airport to a destination associated with UE 120 (if available), or the next flights to any destination (if no destination information is associated with UE 120).

As still another example, a carrier may have a facility located near a particular airport. Trucks or other vehicles associated with the carrier may travel back and forth from the facility to the particular airport along a defined route. If UE 120 is identified as travelling along such a defined route, a communication mode trigger may be updated such that wireless communication is deactivated upon reaching a gate or other terminal location associated with the carrier.

UE 120 may receive trigger updates from local resources (e.g., a UE 120 associated with a carrier, aircraft, airport, etc.). For instance, a carrier may provide updated trigger information to UE 120 across a local wired or wireless channel. For instance, as a package with associated UE 120 is loaded onto an aircraft, an update message including expected departure time, arrival time, etc. may be delivered to UE 120 over the local channel. Similarly, as the package is loaded onto the aircraft, a graphic code, RFID, or other identifying information associated with the package may be scanned or otherwise retrieved and updated carrier information may be sent to mode manager 110 (e.g., expected departure and arrival times for the package). Mode manager 110 may send updated trigger information to UE 120 based on the carrier update.

Figure 2:
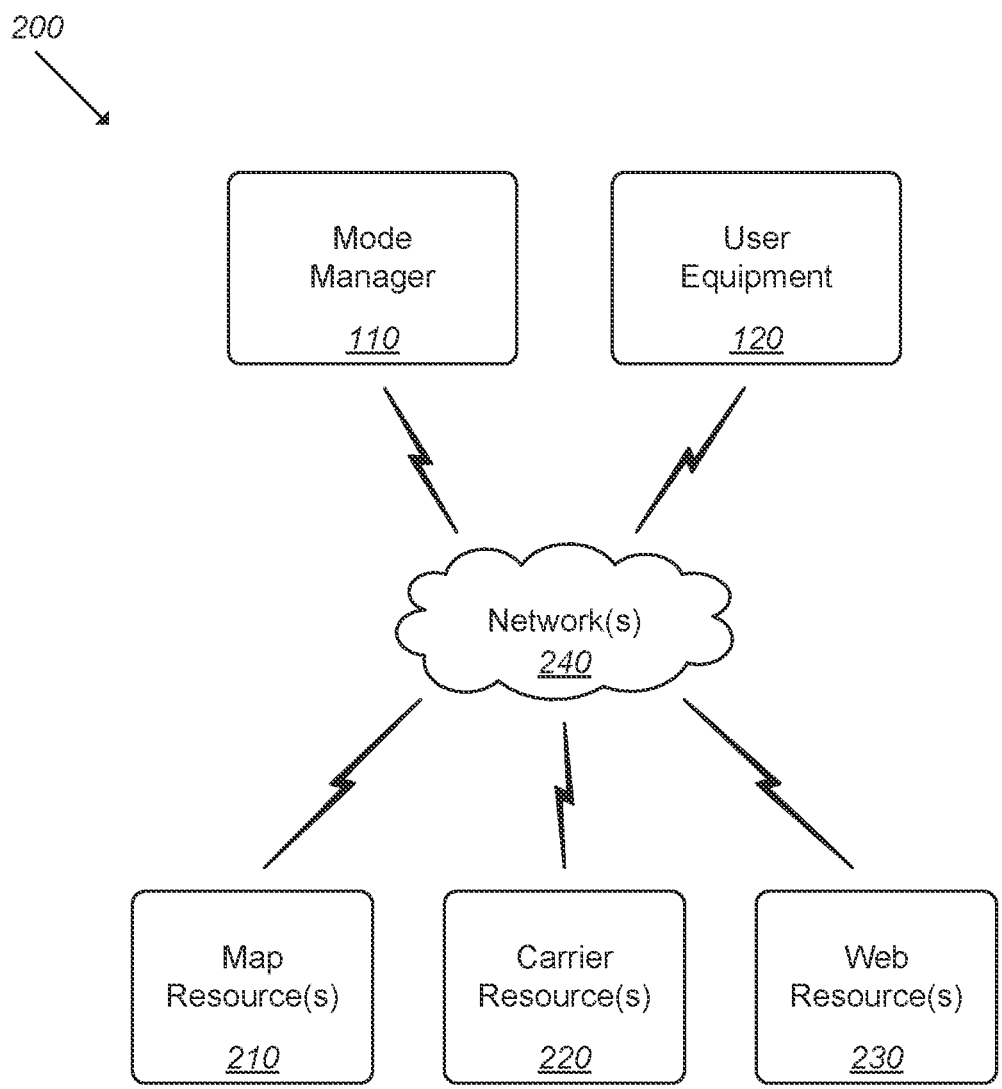
FIG. 2 illustrates an example environment in which one or more embodiments, described herein, may be implemented.

FIG. 2 illustrates an example environment 200 in which one or more embodiments, described herein, may be implemented. As shown, environment 200 may include one or more mode managers 110, UEs 120, map resources 210, carrier resources 220, one or more web resources 230, and network 240. The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

Mode manager 110 may include one or more devices (e.g., a server device or a distributed set of devices, such as a cloud computing system) that perform one or more actions described herein. In some embodiments, portions of the functionality described below with respect to mode manager 110 may be implemented by UE 120. Mode manager 110 may manage information requests from UEs 120, distribute trigger definitions to UEs 120, refine machine learning models, and receive information from other system resources 210-230.

In some embodiments, mode manager 110 may include a location management module that may track UE 120 location. Such location tracking may include receiving location information from UE 120. In some embodiments, mode manager 110 may communicate with various proximity sensors strategically positioned at various appropriate locations (e.g., areas associated with airports, such as departure gates, areas associated with carrier resources such as sorting facilities, and/or other appropriate locations), in order to determine a location of UE 120.

UE 120 may include any computation and communication device that is capable of communicating with one or more networks (e.g., network 240). For example, UE 120 may include a device that tracks location information and environmental data associated with UE 120. UE 120 may also receive user interactions (e.g., voice input, touches on a touchscreen, "clicks" via an input device such as a mouse, etc.). In some implementations, UE 120 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

In some embodiments, UE 120 may be an asset tracker ("AT") or other Internet of things (IoT) device that may be used by shipment management or logistics systems to monitor asset location, status, etc. ATs may be coupled to, embedded into, and/or otherwise associated with various containers, packaging, housings, and/or other appropriate features of various assets. Such assets may include, for instance, goods in transit or expected to be in transit. Processes and features described herein may allow such IoT devices, ATs, and/or other UEs 120 to comply with rules or regulations that require communications to be disabled while in transit (e.g., use of airplane mode when travelling by aircraft). Such programmatic or automatic disabling of communications features while in transit may allow vendors, manufacturers, and/or other parties involved in the transit of such devices to be in compliance with such rules or regulations, without needing to manually disable or power down these devices.

Map resources 210 may include one or more devices (e.g., a server device or a distributed set of devices, such as a cloud computing system) that perform one or more actions described herein. For example, map resources 210 may store and provide information regarding airport locations, carrier facility locations, etc. In some embodiments, map resources 210 may be, or may include, public website, services, or other external systems.

Carrier resources 220 may include one or more devices (e.g., a server device or a distributed set of devices, such as a cloud computing system) that perform one or more actions described herein. For example, carrier resources 220 may store and provide information regarding itinerary or shipment status, UE 120 location, etc. In some embodiments, carrier resources 220 may be, or may include, public website, services, or other external systems.

Web resources 230 may include one or more devices (e.g., a server device or a distributed set of devices, such as a cloud computing system) that provide information to UE 120 and/or mode manager 110 via network 240. Each of the web resources 230 may be associated with an information resource (e.g., airport information, weather, etc.).

Network 240 may include one or more radio access networks ("RANs"), via which mode managers 110 and/or UEs 120 may access one or more other networks or devices, a core network of a wireless telecommunications network, an IP-based packet data network ("PDN"), a wide area network ("WAN") such as the Internet, a private enterprise network, and/or one or more other networks. In some implementations, network 240 may be, include, or be in communication with a cellular network, such as a Second Generation (2G) Global System for Mobile Communications (GSM)/Enhanced Data rate for GSM Evolution (EDGE) network, a Third Generation ("3G") network, a Fourth Generation ("4G") Long-Term Evolution ("LTE") network, a Fifth Generation ("5G") network, a Code Division Multiple Access ("CDMA") network, etc. UE 120 may connect to, and/or otherwise communicate with, via network 240, data servers, application servers, other UEs 120, etc. Network 240 may be connected to, and/or otherwise in communication with, one or more other networks, such as a public switched telephone network ("PSTN"), a public land mobile network ("PLMN"), and/or another network.

Figure 3:
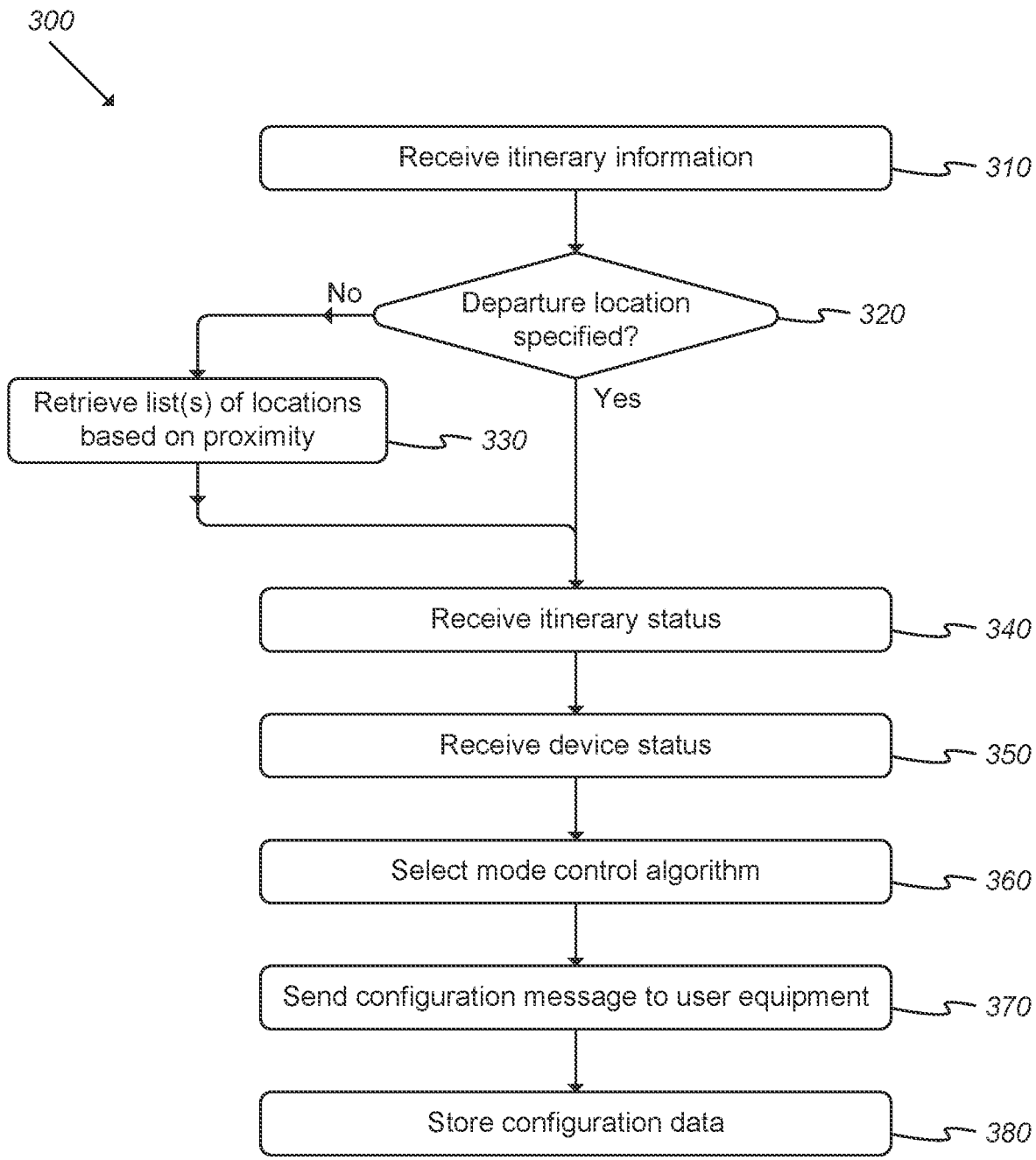
FIG. 3 illustrates an example process by which communication mode triggers may be generated based on itinerary information.

FIG. 3 illustrates an example process 300 by which communication mode triggers may be generated based on itinerary information. As described herein, such communication mode triggers may include a set of conditions to be satisfied before disabling and/or enabling wireless communication features of UE 120. Process 300 may be performed when a UE 120 is powered on, when a client application of some embodiments is launched, and/or at other appropriate times. In some embodiments, process 300 may be performed by mode manager 110. In some embodiments, process 300 may be performed by one or more other devices in addition to, or in lieu of, mode manager 110. Furthermore, in some embodiments a complementary process may be performed by other devices, such as UE 120, map resource 210, carrier resource 220, and/or web resource 230.

As shown, process 300 may include receiving (at 310) itinerary information. Itinerary information may include, for instance, information related to a carrier, origin, destination, departure time, arrival time, and/or other relevant information. Such information may be retrieved from various appropriate resources. For instance, user inputs may be received at UE 120, where such user inputs may include information such as an origin and/or destination. As another example, itinerary information may be retrieved from a resource such as a carrier resource 220, based upon identifying information such as a tracking number associated with UE 120.

Process 300 may include determining (at 320) whether a departure location has been specified. If the process determines (at 320) that no departure location has been specified, the process may retrieve (at 330) a list of locations based on proximity. If the process determines (at 320) that a departure location has been specified, the process may receive (at 340) an itinerary status. Such a determination may be made (at 320) by evaluating the received itinerary information. A departure location may be specified in various appropriate ways, at various levels of granularity (e.g., the departure location may include a specific airport, a city, a "from" address, and/or other appropriate information).

If the process determines (at 320) that no departure location has been specified, the process may retrieve (at 330) a list of locations based on proximity. The list of locations may be retrieved from a resource such as map resource 210. The list of locations may include locations identified based on proximity to UE 120 (e.g., a current location of UE 120), proximity to a specified origin location, and/or proximity to other appropriate landmarks or locations (e.g., a carrier processing facility).

Process 300 may include receiving (at 340) itinerary status, if available. Such status information may be received from a resource such as carrier resource 220. Itinerary status information may indicate whether a live feed or other regularly updated information associated with an itinerary is available.

The process may include receiving (at 350) device status from one or more UEs 120. Such device status may include, for instance, a current location of the device, most recent movement or other identified event, available resources or connectivity, and/or other relevant information. For instance, mode manager 110 may receive a message from UE 120 indicating current battery charge level, available network connections, and current location.

Process 360 may include selecting (at 360) a mode control algorithm based on the received itinerary information, itinerary status, and/or device status. Such mode control algorithms may include, for instance, a direct cloud control ("DCC") algorithm, a cloud adjustment control ("CAC") algorithm, and a predictive location control ("PLC") algorithm. The control mode algorithms will be described in more detail below.

The PLC algorithm may be selected when no itinerary information or only limited information is available. In PLC mode, any nearby airport location may be retrieved and included in a communication mode trigger definition. Utilizing the current location information provided by UE 120, mode manager 110 may compare a location of UE 120 to a local map. If the location of UE 120 is within a proximity of a commercial airport, airplane mode may be automatically enabled. After airplane mode is enabled, UE 120 may periodically monitor whether the UE 120 is airborne utilizing data from local sensors without enabling wireless communication features. If UE 120 determines that the location of UE 120 is not airborne within some specified limit criteria (e.g., after an elapsed time and/or number of evaluations), the radio and GPS features may be enabled in order to provide a current location to mode manager 110. The current location may be compared to the local map data to determine if UE 120 has left the vicinity of the candidate airport. If the location of UE 120 is still within the vicinity of the airport, UE 120 and/or mode manager 110 may determine that the airplane is waiting for takeoff and a UE 120 may disable wireless communication features. If UE 120 is determined to be airborne, UE 120 may periodically monitor local sensor data in order to identify a landing and enable wireless communications after identifying such a landing. Such an airport detection cycle may continue until a user terminates or disables the communication mode feature or if target shipment destination has been provided, the communication mode feature may be disabled automatically if UE 120 is determined to be within the vicinity of the target destination.

The CAC algorithm may be selected when some itinerary information is available (e.g., a third-party carrier tracking number may specify an origin and/or destination). In CAC mode, the list of candidate airports may be reduced versus operation in PLC mode, allowing for reduced frequency of deactivating communication features by reducing the number of candidate airports as compared to the number of candidate airports identified in PLC mode. Such reduction in deactivation frequency may reduce device power consumption and allow for additional collection and/or communication of data including UE location, sensor data, etc. while the communication features of UE 120 are enabled.

The CAC algorithm may require that an origin, target destination, and $3^{rd}$ party source for additional shipment information (e.g.: UPS tracking info) have been provided. Utilizing the shipment route information (e.g., as provided by a user and $3^{rd}$ party source), a filtered target airport list may be generated. The list may be used to setup one or more UE GeoFence alarms. Mode manager 110 may activate the communication mode feature when a GeoFence alarm is triggered. If the $3^{rd}$ party tracking source provides detailed flight or other itinerary information (e.g., departure and/or arrival time), the activation of the communication mode feature may be optimized based on the itinerary information in addition to the location information. Mode manager 110 may schedule UE 120 to check for landing information periodically if specific itinerary information is not available.

The DCC algorithm may be selected when full access to itinerary information such as shipment and flight schedule is available and may further reduce communication frequency with real-time updates. In DCC mode, trigger information may be defined with relatively high specificity, based on real-time or near real-time information related to the itinerary, thus further reducing deactivation frequency and/or duration.

The DCC algorithm may require specific information relevant to the itinerary associated with a UE 120. Utilizing the shipment target destination, starting destination, scheduled flight start and landing info, UE 120 and/or mode manager 110 may generate a list of "expected" flight take-off and landing times. The mode manager 110 may schedule UE 120 to enable the communication mode feature and check for airplane landing based on the provided time(s).

Process 300 may include sending (at 370) a configuration message to one or more UEs 120. Such a configuration message may include, for instance, a list of airport locations, an estimated departure time, estimated arrival time, flight or carrier information, a mode control selection or indication, trigger definitions, and/or other appropriate information.

The process may store (at 380) the configuration data associated with a particular UE 120. Such data may be utilized for machine learning analysis (e.g., by evaluating the accuracy of predicted versus actual data for a particular UE 120).

Figure 4:
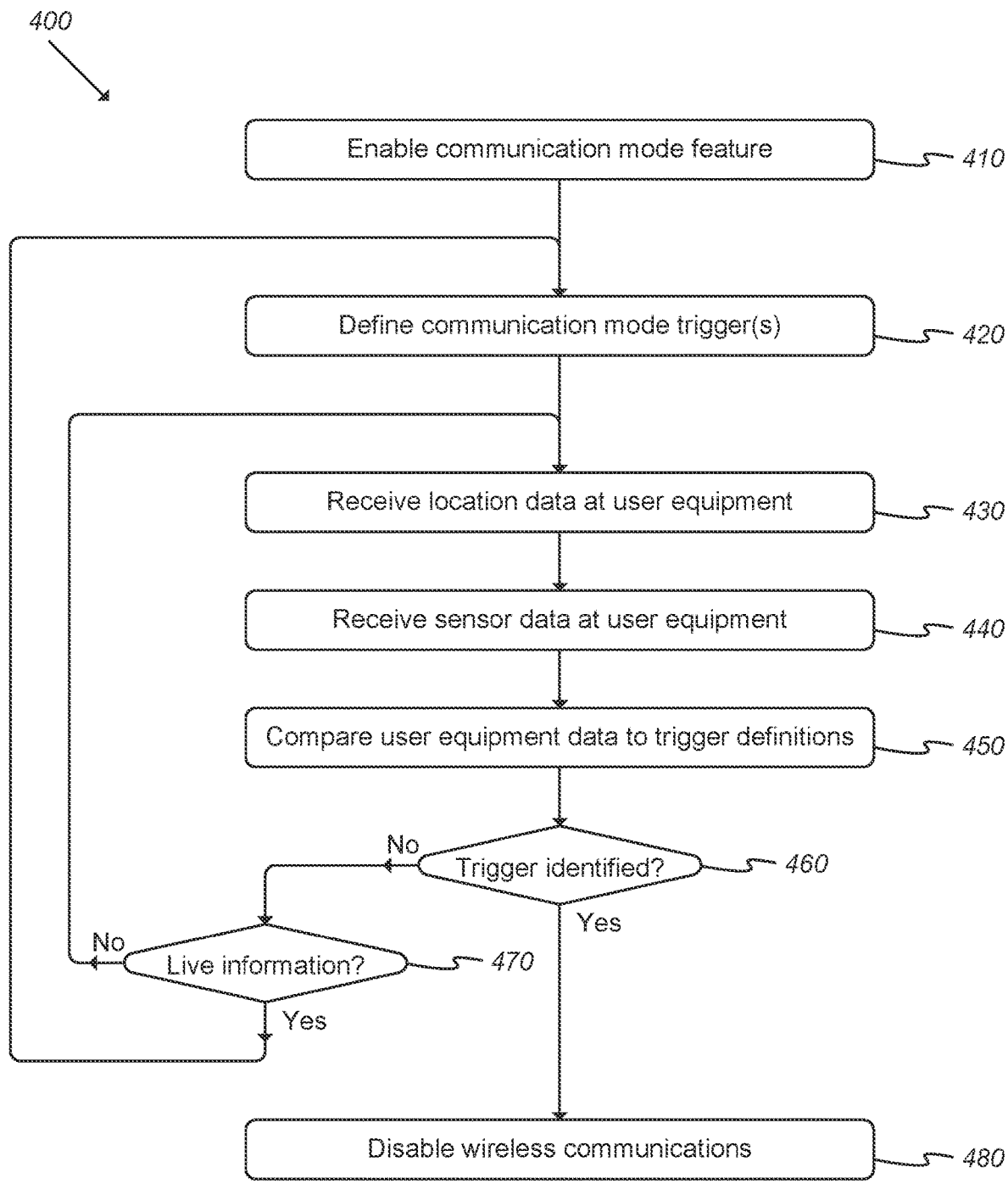
FIG. 4 illustrates an example process by which UE information is monitored and compared to communication mode triggers to identify trigger events.

FIG. 4 illustrates an example process 400 by which UE information is monitored and compared to communication mode triggers to identify trigger events. As described herein, trigger event identification may be utilized to enable and/or disable wireless communications. Process 400 may be performed when UE 120 is powered on, when a client application of some embodiments is executed, and/or at other appropriate times. In some embodiments, process 400 may be performed by UE 120. In some embodiments, process 400 may be performed by one or more other devices in addition to, or in lieu of, UE 120. Furthermore, in some embodiments a complementary process may be performed by other devices, such as mode manager 110.

As shown, process 400 may include enabling (at 410) a communication mode feature. Such a feature may be implemented at UE 120 such that UE may automatically disable and/or enable wireless communication based on communication mode triggers and/or exit event triggers as described above.

Process 400 may include defining (at 420) one or more communication mode triggers. Such trigger definitions may include various elements, such as an origin, destination, departure time, etc.

Process 400 may include receiving (at 430) location data at UE 120. Such location data may be received from local resources (e.g., a GPS module of UE 120), and/or external resources. For example, mode manager 110 may monitor a location of UE 120 based on information received from UE 120, other appropriate resources such as local proximity sensors of some embodiments, and/or web resources 230 and/or carrier resource 220 via Network 240.

Process 400 may include receiving (at 440) sensor data at UE 120. Such sensor data may include, for instance, accelerometer data received from one or more accelerometers associated with UE 120. Such sensor data may include location or position information related to UE 120.

Process 400 may include comparing (at 450) UE 120 sensor and/or location data to the various communication mode triggers defined at 420. Process 400 may include determining (at 460) whether a trigger event has been identified. Such a determination may be based on the comparison of UE 120 sensor and/or location data to the various trigger definitions.

As described above, a trigger event may include a location and/or proximity to the location. If UE 120 sensor and/or location data indicates that UE 120 is within the specified proximity to the specified location, a trigger event may be identified. As described above, the trigger event may include multiple conditions that must be satisfied in order for a trigger to be identified. For instance, a trigger definition may include a proximity to a location and a departure time window, where the UE 120 location must be within the specified proximity to the location during the departure time window in order for a trigger to be identified.

In some embodiments, if no trigger event is identified (at 460—NO) within a specified timeout period, process 400 may include disabling the communication mode feature enabled at 410. UE 120 may update itinerary information and/or communication mode configuration information using a process such as process 300 if the communication mode feature is disabled.

Process 400 may include determining (at 470) whether live information is available. If the process determines that live or real-time itinerary information is available (at 470—YES), the process receive such updated information and may update (at 420) communication mode trigger definitions based on the updated itinerary information and may iteratively perform elements 420-470 until a trigger is identified (at 460—YES). Updated itinerary information may be received from a resource such as carrier resource 220 and/or web resource 230.

If the process determines (at 470—NO) that live information is not available, the process may iteratively receive (at 430) location data at UE 120, receive (at 440) sensor data at UE 120, compare (at 450) UE data to trigger definitions, and determine (at 460) whether a trigger event has been identified until a trigger event is identified (at 460—YES) or some other criteria is satisfied (e.g., a timeout period is reached or an abort event is identified).

If a trigger is identified (at 460—YES), process 400 may disable (at 480) wireless communications and may monitor local sensor information in order to identify an exit trigger. UE 120 may monitor local information using a process such as process 500 described below.

Figure 5:
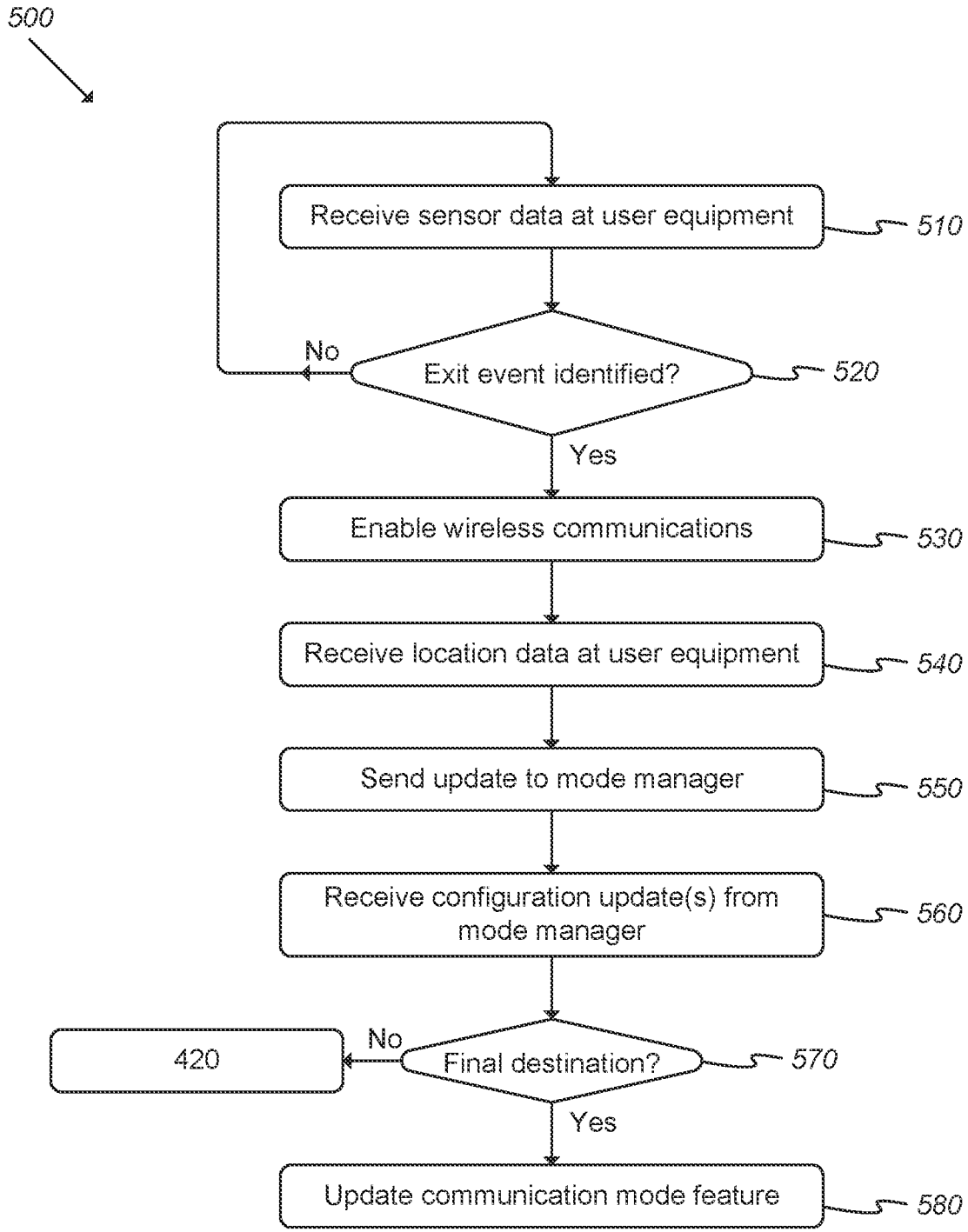
FIG. 5 illustrates an example process by which UE information is monitored locally when wireless communications are disabled and compared to communication mode exit triggers to identify trigger events.

FIG. 5 illustrates an example process 500 by which UE information is monitored locally when wireless communications are disabled and compared to communication mode exit triggers to identify exit trigger events. As described herein, exit trigger events may be used to enable wireless communications. Process 500 may be performed when wireless communication is disabled and/or at other appropriate times. In some embodiments, process 500 may be performed by UE 120. In some embodiments, process 500 may be performed by one or more other devices in addition to, or in lieu of, UE 120. Furthermore, in some embodiments a complementary process may be performed by other devices, such as mode manager 110.

As shown, process 500 may include receiving sensor data at UE 120. Such sensor data may be received from sensors associated with UE 120. Such sensors may include, for instance, accelerometers, gyroscopes, speedometers, altimeters, barometers, temperature sensors, hygrometers, and/or various other sensors that are able to measure various parameters without use of communication features of UE 120.

In some embodiments, the data received (at 510) may include event data received from local peripheral devices associated with UE 120. Such local peripheral devices may include, for instance, one or more UI inputs, keyboards, wired sensors, and/or various other device that are able to measure various parameters and/or generate event notifications without use of wireless communication features of UE 120.

Process 500 may include determining (at 520) whether an exit trigger event has been identified. Such events may be identified by comparing UE 120 information such as sensor information to one or more exit trigger definitions. As discussed above, in some embodiments an exit trigger may include a takeoff event and a landing event. Such events may be identified by comparing acceleration or positioning data, for instance, to some evaluation criteria.

If no exit event is identified, the process may continue to receive (at 510) sensor and/or event data and determine (at 520) whether an exit event has been identified based on the received data until the process determines that an exit event has been identified. The exit trigger event may include a transit time duration limit (e.g., if a takeoff event is identified and no landing event is identified within the transit time duration limit, an exit trigger may be identified), initialization time limit (e.g., if no takeoff event is identified within a specified time limit of enabling the communication mode feature, some embodiments may identify an exit trigger event), and/or other appropriate timeout or other exit triggers.

If process 500 determines that an exit event has been identified (at 520), the process may enable (at 530) wireless communications features. Process 500 may include receiving (at 540) location data at UE 120. Such location data may be received from local resources (e.g., a GPS module of UE 120, external resources or sensors associated with UE 120, etc.) and/or from external resources (e.g., mode manager 110).

Process 500 may send (at 550) an update to mode manager 110. Such an update may include information such as location of the UE 120, UE status information, event trigger information, and/or other relevant information. Process 500 may include receiving (at 560) a configuration message from mode manager 110. Such a configuration message may include information such as sensor information, updated trigger conditions or definitions, itinerary status or live feed information, updated machine learning models, mode control algorithm selections, and/or other relevant information.

The process may determine (at 570) whether the final destination has been reached. Such a determination may be made by comparing a current location to a final location, based on itinerary information associated with UE 120.

If the process determines that the final destination has not been reached, the process may define or update (at 420) one or more communication mode triggers and further execute process 400 as described above.

If the process determines that the final destination has been reached (at 570), the process may update (at 580) the communication mode feature such that communication features of UE 120 are enabled without regard for matching of any trigger definition. Thus, for instance, UE 120 may be at a location within an area associated with an airport without causing communication features to be deactivated.

Figure 6:
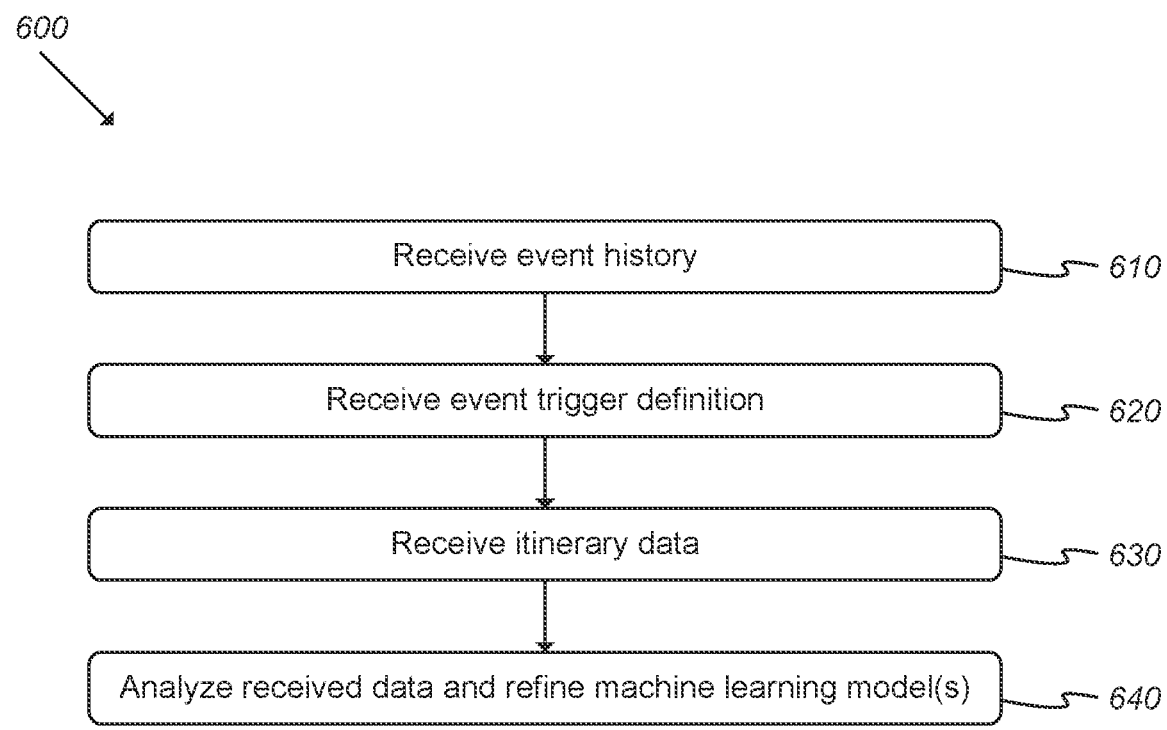
FIG. 6 illustrates an example process by which machine learning is applied to event history and used to update event trigger definitions.

FIG. 6 illustrates an example process 600 by which machine learning is applied to event history and used to update event trigger definitions. Process 600 may be performed when a trigger event is identified, when a UE 120 reaches a final destination, and/or at other appropriate times. In some embodiments, process 600 may be performed by mode manager 110. In some embodiments, process 600 may be performed by one or more other devices in addition to, or in lieu of, mode manager 110. Furthermore, in some embodiments a complementary process may be performed by other devices, such as UE 120 or carrier resource 220.

As shown, process 600 may include receiving (at 610) event history. Such event history may be received from a storage or other resource accessible to mode manager 110. Event information including UE sensor data, event time(s), trigger definitions, etc. may be received by mode manager 110 from UEs 120. The event information may be stored by mode manager 110, UE 120, and/or other appropriate resources.

Process 600 may include receiving (at 620) event trigger definition information. Such event trigger definition information may include, for instance, mode control algorithm selected, condition definitions, etc.

The process may receive (at 630) itinerary data. Such itinerary data may include carrier or other third-party data, user feedback, and/or other appropriate information that may be related to trigger event definition or analysis. Itinerary data may include information such as departure location, arrival location, departure time, arrival time, status information, aircraft type and/or status, and/or other relevant itinerary information available from carrier resource 220. Other third-party data may include map data received from map resource 210 and/or other data received from web resources 230 (e.g., weather information).

Process 600 may include analyzing (at 640) the received data to refine machine learning models of some embodiments. Such analysis may include, for instance, comparison of sensor or other information collected at UE 120 while communications are disabled to transmit data indicating departure and/or arrival location, time, etc., as determined by a resource such as carrier resource 220.

Figure 7:
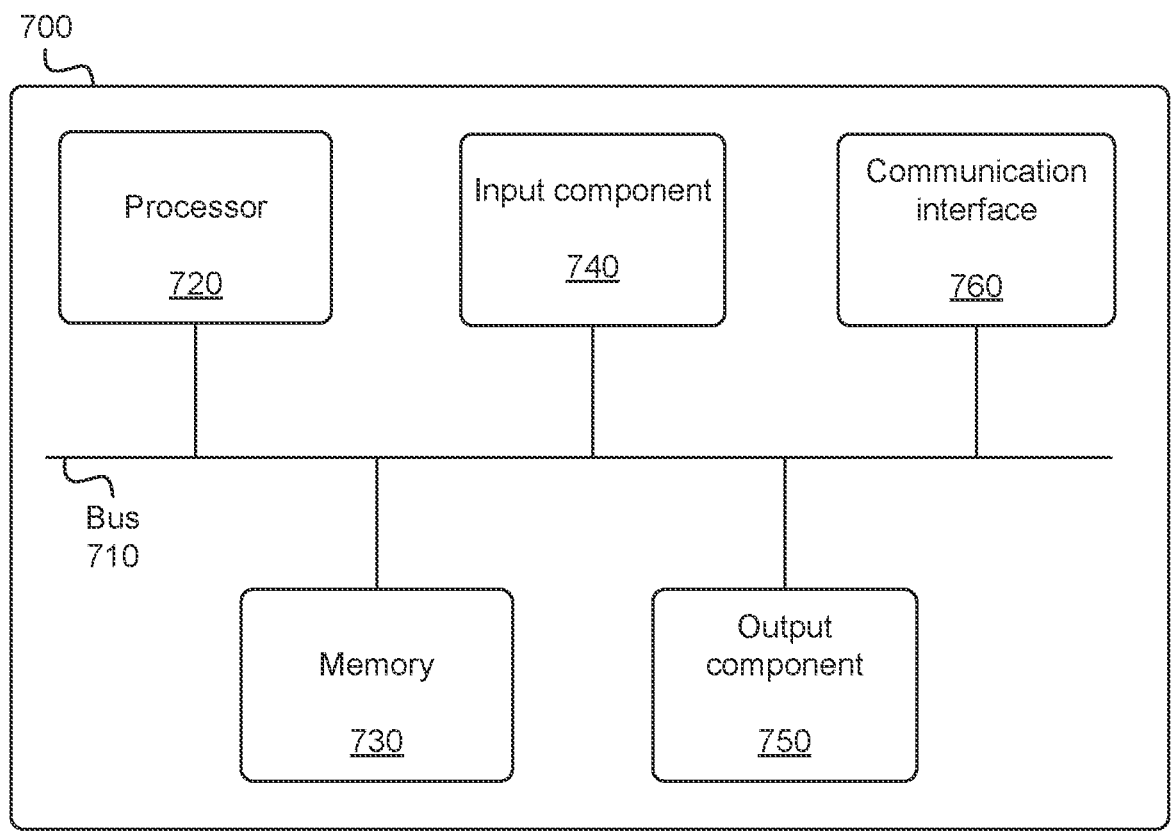
FIG. 7 illustrates example components of one or more devices, according to one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, a WiFi radio, a cellular radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks have been described with regard to FIGS. 1 and 3-6, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      identify one or more models that are based on motion sensor data received from a plurality of User Equipment ("UEs"), wherein the one or more models associate one or more trigger conditions to one or more sets of the motion sensor data received from the plurality of UEs, wherein the one or more trigger conditions include an aircraft takeoff event;
      receive particular motion sensor data associated with a particular UE;
      compare the received particular motion sensor data to the one or more sets of motion sensor data associated with the one or more models;
      identify, based on the comparing, that a particular aircraft takeoff event, as indicated by the one or more trigger conditions associated with the one or more models, has occurred; and
      disable one or more wireless communication features associated with the particular UE based on determining that the particular aircraft takeoff event has occurred.

2. The device of claim 1, wherein the one or more processors are further configured to:
   generate or modify the one or more models using one or more machine learning techniques.

3. The device of claim 1, wherein the one or more processors are further configured to:
   receive location data indicating a location of the particular UE,
   wherein the one or more models further associate the one or more trigger conditions to location data associated with one or more locations from which aircraft depart.

4. The device of claim 1, wherein the one or more processors are further configured to:
   receive audio data collected by the particular UE,
   wherein the one or more models further associate the one or more trigger conditions to audio data associated with the aircraft takeoff event.

5. The device of claim 4, wherein the one or more models include one or more sonic profiles, wherein the one or more processors are further configured to:
   determine that the audio data collected by the particular UE matches a particular sonic profile of the one or more sonic profiles.

6. The device of claim 1, wherein the one or more wireless communication features are associated with communications between the particular UE and a wireless network, wherein the motion sensor data associated with the particular UE is associated with local device resources of the particular UE.

7. The device of claim 1, wherein the association between the one or more trigger conditions and the one or more sets of motion sensor data are based on feedback received via one or more UEs, of the plurality of UEs, after wireless communication features of the one or more UEs were disabled based on the one or more trigger conditions.

8. A non-transitory computer-readable medium, storing a set of processor-executable instructions to:
   identify one or more models that are based on motion sensor data received from a plurality of User Equipment ("UEs"), wherein the one or more models associate one or more trigger conditions to one or more sets of the motion sensor data received from the plurality of UEs, wherein the one or more trigger conditions include an aircraft takeoff event;
   receive particular motion sensor data associated with a particular UE;
   compare the received particular motion sensor data to the one or more sets of motion sensor data associated with the one or more models;
   identify, based on the comparing, that a particular aircraft takeoff event, as indicated by the one or more trigger conditions associated with the one or more models, has occurred; and
   disable one or more wireless communication features associated with the particular UE based on determining that the particular aircraft takeoff event has occurred.

9. The non-transitory computer-readable medium of claim 8, wherein the plurality of processor-executable instructions further include processor-executable instructions to:

generate or modify the one or more models using one or more machine learning techniques.

10. The non-transitory computer-readable medium of claim 8, wherein the set of processor-executable instructions further include processor-executable instructions to:
receive location data indicating a location of the particular UE,
wherein the one or more models further associate the one or more trigger conditions to location data associated with one or more locations from which aircraft depart.

11. The non-transitory computer-readable medium of claim 8, wherein the set of processor-executable instructions further include processor-executable instructions to:
receive audio data collected by the particular UE,
wherein the one or more models further associate the one or more trigger conditions to audio data associated with the aircraft takeoff event.

12. The non-transitory computer-readable medium of claim 11, wherein the one or more models include one or more sonic profiles, wherein the plurality of processor-executable instructions further include processor-executable instructions to:
determine that the audio data collected by the particular UE matches a particular sonic profile of the one or more sonic profiles.

13. The non-transitory computer-readable medium of claim 8, wherein the one or more wireless communication features are associated with communications between the particular UE and a wireless network, wherein the motion sensor data associated with the particular UE is associated with local device resources of the particular UE.

14. The non-transitory computer-readable medium of claim 8, wherein the association between the one or more trigger conditions and the one or more sets of motion sensor data are based on feedback received via one or more UEs, of the plurality of UEs, after wireless communication features of the one or more UEs were disabled based on the one or more trigger conditions.

15. A method, comprising:
identifying one or more models that are based on motion sensor data received from a plurality of User Equipment ("UEs"), wherein the one or more models associate one or more trigger conditions to one or more sets of the motion sensor data received from the plurality of UEs, wherein the one or more trigger conditions include an aircraft takeoff event;
receiving particular motion sensor data associated with a particular UE;
comparing the received particular motion sensor data to the one or more sets of motion sensor data associated with the one or more models;
identifying, based on the comparing, that a particular aircraft takeoff event, as indicated by the one or more trigger conditions associated with the one or more models, has occurred; and
disabling one or more wireless communication features associated with the particular UE based on determining that the particular aircraft takeoff event has occurred.

16. The method of claim 15, the method further comprising:
generating or modifying the one or more models using one or more machine learning techniques.

17. The method of claim 15, further comprising:
receiving location data indicating a location of the particular UE,
wherein the one or more models further associate the one or more trigger conditions to location data associated with one or more locations from which aircraft depart.

18. The method of claim 15, further comprising:
receiving audio data collected by the particular UE,
wherein the one or more sets of sensor data include one or more sonic profiles associated with the aircraft takeoff event, the method further comprising:
determining, based on the comparing, that the audio data matches a particular sonic profile of the one or more sonic profiles.

19. The method of claim 15, wherein the one or more wireless communication features are associated with communications between the particular UE and a wireless network, wherein the motion sensor data associated with the particular UE is associated with local device resources of the particular UE.

20. The method of claim 15, wherein the association between the one or more trigger conditions and the one or more sets of motion sensor data are based on feedback received via one or more UEs, of the plurality of UEs, after wireless communication features of the one or more UEs were disabled based on the one or more trigger conditions.

* * * * *